Dec. 11, 1923.
P. H. BRAINARD
HEAT INSULATED CONTAINER
Filed Jan. 25, 1923
1,477,101
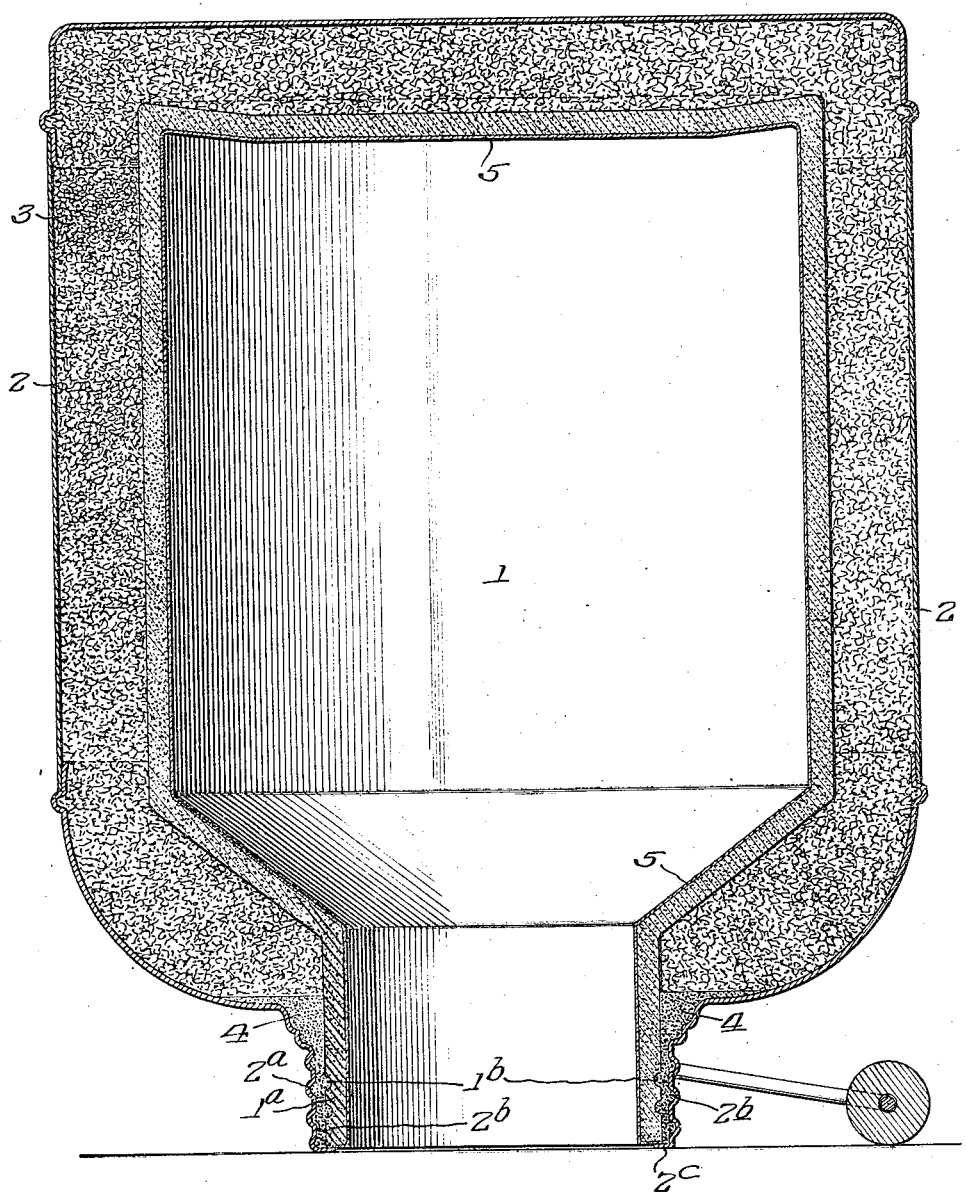

Patented Dec. 11, 1923.

1,477,101

UNITED STATES PATENT OFFICE.

PEARL H. BRAINARD, OF MACOMB, ILLINOIS.

HEAT-INSULATED CONTAINER.

Application filed January 25, 1923. Serial No. 614,761.

*To all whom it may concern:*

Be it known that I, PEARL H. BRAINARD, a citizen of the United States, residing at Macomb, in the county of McDonough and State of Illinois, have invented certain new and useful Improvements in Heat-Insulated Containers, of which the following is a specification.

This invention relates to containers having walls contructed with special reference to resistance of heat conduction from the exterior to the interior of the container, or vice versa. The embodiment of the invention herein selected for purpose of illustration is designed particularly to serve as a portable container, but it is to be understood that the novel features of the invention are applicable to containers designed for a wide variety of other purposes, such, for instance, as stationary water coolers, refrigerators, incubators, and, in short, any container in which it is desirable to prevent the conduction of heat through the walls.

The invention has particular reference to containers, the walls of which comprise inner and outer shells positioned to leave a space between them which is especially treated to render it of low heat conductivity, preferably by filling it with a suitable material, such for instance, as ground cork, and particularly to a double wall container in which the inner shell constitutes a receptacle for goods to be protected.

One object of the present invention is to provide an inner shell or receptacle of a construction which will not only render it economical to produce but very durable in use, and particularly of a nature which adapts it to contribute largely to resistance of heat transmission. Accordingly, one feature of the invention consists in making the inner shell of the container of a highly porous non-vitreous clay of sufficient thickness to afford substantial resistance to heat conduction, as, for instance, by taking a quality of clay which is refractory rather than vitreous, molding therefrom a receptacle of desired size and form, and soft-burning the receptacle thus produced in order to leave it in a relatively light and porous physical condition, and with a thickness that affords a substantial resistance to heat conductivity. The receptacle is glazed on the interior to render it impervious, but left free from glazing on the exterior. I have found in practice that a receptacle or inner shell made of material of the kind stated and having a general thickness of one-quarter of an inch will answer well the purposes stated, and add greatly to the efficiency of a double walled container surrounded by known means of insulation, such, for instance, as a substantial layer of ground cork.

Another object of the invention is to provide a double walled container of the kind stated, in which an inner wall of earthy material is substantially and durably united with an outer shell of metal, spaced from the inner wall throughout their opposed areas including the restricted area of union. Accordingly, another feature of the invention consists in forming the inner and outer shells with restricted areas of substantially parallel and opposed surfaces, as, for instance, at limited annular portions of concentric necks formed on the two shells and with a substantial space between said faces, and filling such space with a cement having the characteristic of setting and becoming hard and solid so as to hold the one receptacle rigidly and immovably within the other; the material of the inner receptacle, and particularly the surface thereof which receives the cement, being of a highly porous earthy material with which the cement will enter into very strong adhesion; and both of the opposed surfaces to be united being preferably grooved in a manner to secure against displacement the body of cement which unites them.

The invention will be fully understood upon reference to the accompanying drawing, which shows in vertical longitudinal section, and in an inverted position, a water bottle embodying the several features of the invention.

1 represents the inner receptacle, 2 the outer receptacle, positioned one within the other with a substantial space between them, and 3 represents a filling of ground cork or other material of low heat conductivity filling said space. The receptacles 1 and 2 are constructed, respectively, with necks 1ª, 2ª, located with a substantial space between them, and this space is filled with a body 4 of hard setting cement, the necks being provided, respectively, with grooves 1ᵇ and 2ᵇ to firmly key this body of cement between them. Preferably the neck 2ª will have an inturned flange 2ᶜ for determining the axial relation between the inner and outer receptacles, and this, together with the necks 1ª and 2ª, constitutes a mold in which the uniting body 4 of cement can be conveniently and accurately cast when the assembled receptacles of the container are placed in inverted position, with the bottom section of the outer receptacle or shell omitted and before the insulating filler 3 is put in place.

The body 4 of cement is preferably built up to a level slightly above the shoulder of the outer shell or receptacle as shown, as this insures a solid body of cement and permits the cement to be introduced in a relatively slack condition in which it can flow intimately into all the spaces.

An important feature of the present invention resides in the relative thickness of the inner receptacle 1 and the material of which it is constructed. It is made of an earthy material of a character which retains a highly cellular or porous condition after it is hardened, with the result that it has inherently a very low coefficient of heat conductivity, and its thickness is such as to cause this attribute of the material to substantially increase the heat resistance of the whole structure. In practice, I have usually employed for this part of the construction a refractory and relatively non-vitreous clay, and have soft-burned the receptacle after it is shaped as distinguished from hard-burning it, namely, by controlling the kiln temperature to which it is submitted; and glazing is applied to but one side, namely, the inside, as shown at 5, the exterior surface being left free from surfacing material which might tend to raise the coefficient of conductivity.

The material of which the inner receptacle 1 is constructed is particularly advantageous in securing a solid and immovable union between the necks of the receptacles by the cement filler 4, as the cement adheres very much more intimately with the surface of the inner receptacle by reason of its non-glazed porous condition. The cement used for uniting the inner and outer shells is preferably a good grade of Portland cement, or equivalent material, with a sufficient proportion of plaster of Paris to neutralize any acid condition of the cement, or preferably hydrated lime in sufficient proportion for this purpose, or equivalent alkaline matter, as this will lend the additional advantage of rendering the cement union still less pervious to moisture.

While I have described in detail the preferred embodiment of the several features of my invention, I desire it understood that the terms of the appended claims rather than the detailed description are to be taken as defining the scope of the invention.

I claim:

1. A heat insulated container having walls constructed with spaced inner and outer shells, of which the inner shell is composed of highly porous substantially non-vitreous earthy material having a thickness which offers substantial resistance to passage of heat by conduction.

2. A heat insulated container having walls constructed with spaced inner and outer shells, of which the inner shell is composed of highly porous substantially non-vitreous earthy material having a thickness which offers substantial resistance to passage of heat by conduction; the exterior surface of said inner shell being free from glazing.

3. A heat insulated container having walls constructed with spaced inner and outer shells, of which the inner shell is composed of highly porous, refractory and non-vitreous earthy material having a thickness which offers substantial resistance to passage of heat by conduction.

4. A heat insulated container having walls constructed with spaced inner and outer shells, of which the inner shell is composed of highly porous soft-baked earthy material non-flowing under the heat of baking and having a thickness which offers substantial resistance to passage of heat by conduction.

5. A heat insulated container having walls constructed with spaced inner and outer shells, of which the inner shell is composed of highly porous substantially non-vitreous earthy material having a thickness which offers substantial resistance to passage of heat by conduction; said shells being rigidly united by a hard body of cement filling the space between restricted areas of opposed walls of said shells, and in adhesion to an unglazed surface of said inner shell.

6. A heat insulated container having walls constructed with spaced inner and outer receptacles, of which the inner receptacle is composed of highly porous earthy substantially non-vitreous material having a thickness which offers substantial resistance to passage of heat by conduction; said receptacles being constructed with overlapping necks and being rigidly united by a body of hard cement filling the space between their necks; the neck of the inner receptacle presenting to said cement an unglazed porous surface.

7. A heat insulated container having walls constructed with spaced inner and outer receptacles, of which the inner receptacle is composed of highly porous soft burned and substantially non-vitreous earthy material having a thickness which offers substantial resistance to passage of heat by conduction; said receptacles being constructed with overlapping necks and being rigidly united by a body of hard cement filling the space between their necks; the neck of the inner receptacle presenting a pervious non-glazed surface for adhesion of said cement.

Signed at Chicago, Illinois, this 19th day of January, 1923.

PEARL H. BRAINARD.